United States Patent [19]
Sougawa et al.

[11] Patent Number: 5,174,112
[45] Date of Patent: Dec. 29, 1992

[54] EXHAUST GAS PURIFYING DEVICE FOR AN OUTBOARD MOTOR

[75] Inventors: Masafumi Sougawa; Atsushi Isogawa, both of Hamamatsu, Japan

[73] Assignee: Sanshin Kogyo Kabushiki Kaisha, Hamamatsu, Japan

[21] Appl. No.: 710,789

[22] Filed: Jun. 5, 1991

[30] Foreign Application Priority Data

Jun. 5, 1990 [JP] Japan .................................. 2-147101

[51] Int. Cl.$^5$ .............................................. F01N 3/28
[52] U.S. Cl. ......................................... 60/302; 440/89
[58] Field of Search .................... 60/302, 299; 440/89

[56] References Cited

U.S. PATENT DOCUMENTS

| | | | |
|---|---|---|---|
| 4,353,208 | 10/1982 | Volker | 60/299 |
| 4,735,046 | 4/1988 | Iwai | 60/302 |
| 4,965,997 | 10/1990 | Suzuki | 60/313 |

FOREIGN PATENT DOCUMENTS

55-10043 1/1980 Japan .

*Primary Examiner*—Douglas Hart
*Attorney, Agent, or Firm*—Ernest A. Beutler

[57] ABSTRACT

An exhaust gas purifying arrangement is provided for an outboard motor for a watercraft. At least one exhaust port is provided which opens into a first exhaust passage having a first catalyst member lining at least a portion of its inner wall. The first exhaust passage then opens into an exhaust expansion chamber. Next, a second exhaust passage originates just beyond the expansion chamber. A second catalyst member is mounted within and across a section of exhaust passage beyond the first exhaust passage and at a location above the water line within which the outboard motor operates. A first passageway is provided which leads from the second exhaust passage, from a position beyond the second catalyst member, to an exhaust outlet located at a position below a body of water in which the watercraft operates. And a second passageway leads from the second exhaust passage, also from a position beyond the second catalyst member, to an exhaust outlet located at a position above the body of water in which the watercraft operates. The catalyzer system of the invention is particularly useful for the treating of exhaust gases without introducing undesirable restrictions to exhaust gas flow.

19 Claims, 6 Drawing Sheets

EXHAUST GAS PURIFYING DEVICE FOR AN OUTBOARD MOTOR

BACKGROUND OF THE INVENTION

This invention relates to an exhaust gas purifying device for a marine engine and more particularly to an improved and highly effective system for treating the exhaust gases of an engine prior to their discharge to the atmosphere.

In many types of applications for internal combustion engines, the engine exhaust gases are delivered to the atmosphere through alternate exhaust gas discharges. For example, in connection with outboard motors, it is normally the practice to discharge the exhaust gases through an underwater exhaust gas discharge when traveling at high speeds. However, when traveling at lower speeds and when the high speed exhaust gas discharge is more deeply submerged, the exhaust gases are normally delivered directly to the atmosphere through an above the water exhaust gas discharge. Although such arrangements are satisfactory, if it is desired to treat the exhaust gases with a catalyzer so as to prevent the discharge of unwanted exhaust gas constituents to the atmosphere, the system for treating the exhaust gases can be extremely cumbersome.

In a conventional exhaust gas purifying device for outboard motors, a catalyst is disposed at a position in an exhaust passage connecting exhaust ports of the engine to an expansion chamber. The catalyst, however, may create a flow resistance which chokes the exhaust passage and results in decreased engine performance.

It is, therefore, a principal object of this invention to provide an improved and highly effective arrangement for treating the exhaust gases of an internal combustion engine in which the exhaust system has two different atmospheric discharges.

It is a further object of this invention to provide an improved catalyzer system for treating the exhaust gases without introducing undesirable restrictions to exhaust gas flow.

SUMMARY OF THE INVENTION

An exhaust gas purifying arrangement is provided for an outboard motor for a watercraft comprising at least one exhaust port which opens into a first exhaust passage having a first catalyst member lining at least a portion of an inner wall of the first exhaust passage. Further, an exhaust expansion chamber is provided with the first exhaust passage opening into the exhaust expansion chamber. Next, a second exhaust passage originates just beyond the expansion chamber. A second catalyst member is mounted within and across a section of exhaust passage beyond the first exhaust passage. At least one discharge passageway is provided, positioned beyond the second catalyst member, for discharging the exhaust gas from the outboard motor.

DETAILED DESCRIPTION OF THE PREFERRED EMBODIMENTS

Figure 1:
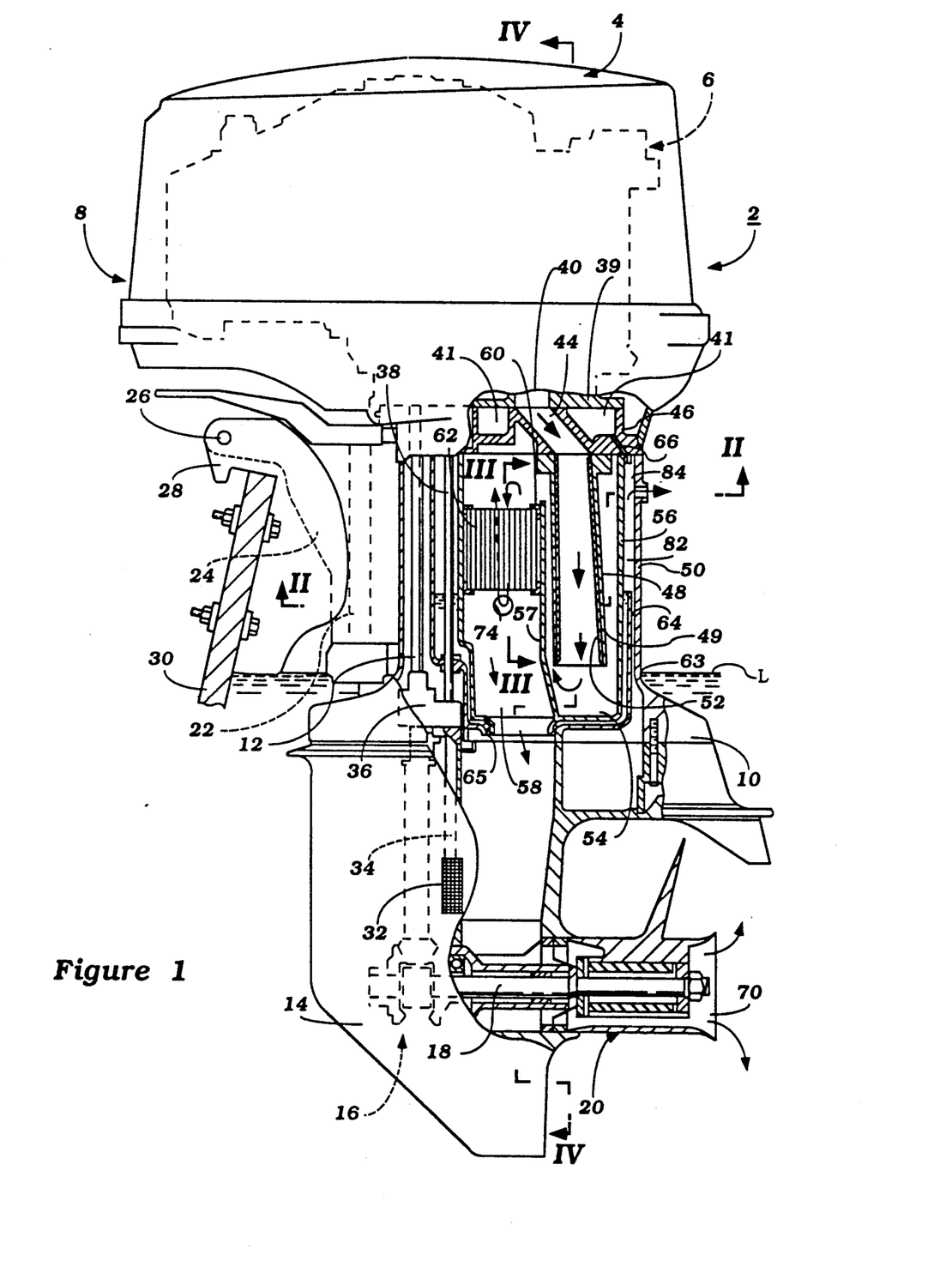
FIG. 1 is a side elevational view, with portions broken away, of an outboard motor constructed in accordance with an embodiment of the invention.

Referring first to FIG. 1, an outboard motor constructed in accordance with an embodiment of the invention is identified generally by the reference numeral 2. The outboard motor includes a powerhead, indicated generally by the reference numeral 4 and containing an internal combustion engine 6 that is surrounded by a protective cowling 8. The engine 6 is of any known type, for example, a multi-cylinder reciprocating engine operating on the two-cycle principle. In accordance with conventional outboard motor practice, the engine 6 is disposed so that its output or crankshaft rotates about a generally vertically extending axis.

Depending from the powerhead 4 and affixed to it in a known manner is a drive shaft housing, indicated generally by the reference numeral 10, in which a drive shaft, indicated by the reference numeral 1 is contained and is rotatably supported in a suitable manner. The driveshaft 12 extends through the drive shaft housing 10 into a lower unit 14 that is affixed to the drive shaft housing 10 and in which a suitable forward, neutral, reverse transmission, indicated by the reference numeral 16, is positioned for driving a propeller shaft 18, which, in turn, has a propeller 20 mounted at its rearward end.

A steering shaft 22 is affixed to the driveshaft housing 10 and is journaled within a swivel bracket 24 for steering of the outboard motor 2 about a vertically extending axis. The swivel bracket 24 is, in turn, pivotally supported by means of a pivot pin 26 and clamping bracket 28 for tilting movement of the outboard motor 2 about a horizontally disposed tilt axis defined by the pivot pin 26. The clamping bracket 28 may be detachably connected to a transom 30 of an associated watercraft.

The engine 6 is of the water-cooled type and the coolant is derived from the body of water in which the outboard motor 2 operates through a water intake 32 that is positioned within the lower unit 14 and from which a supply conduit 34 extends. The supply conduit 34 terminates at a coolant pump 36 that is disposed at the lower end of the drive shaft housing 10 and which is driven by the drive shaft 12 in a known manner. Pressurized coolant is delivered from the pump 36 to the engine 6 through a supply line 38 that extends upwardly through the drive shaft housing 10 and which terminates at an inlet of the engine 6.

Figure 2:
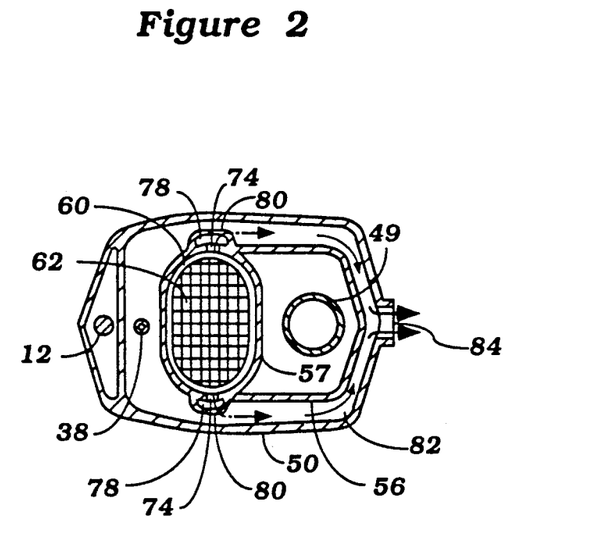
FIG. 2 is a cross-sectional view taken along the line II—II of FIG. 1.
Figure 3:
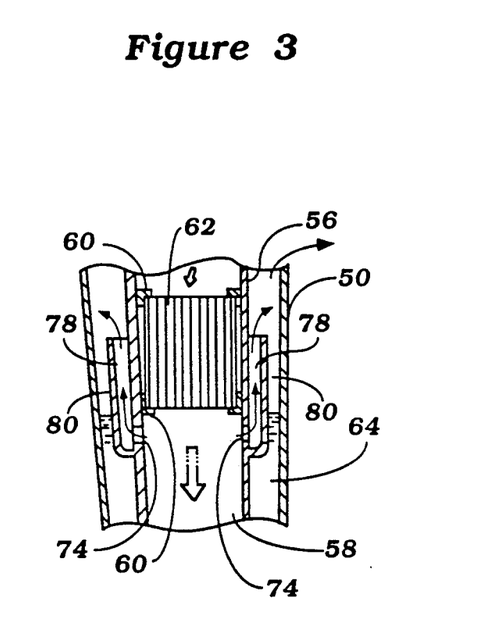
FIG. 3 is a cross-sectional view taken along the line III—III of FIG. 1.
Figure 4:
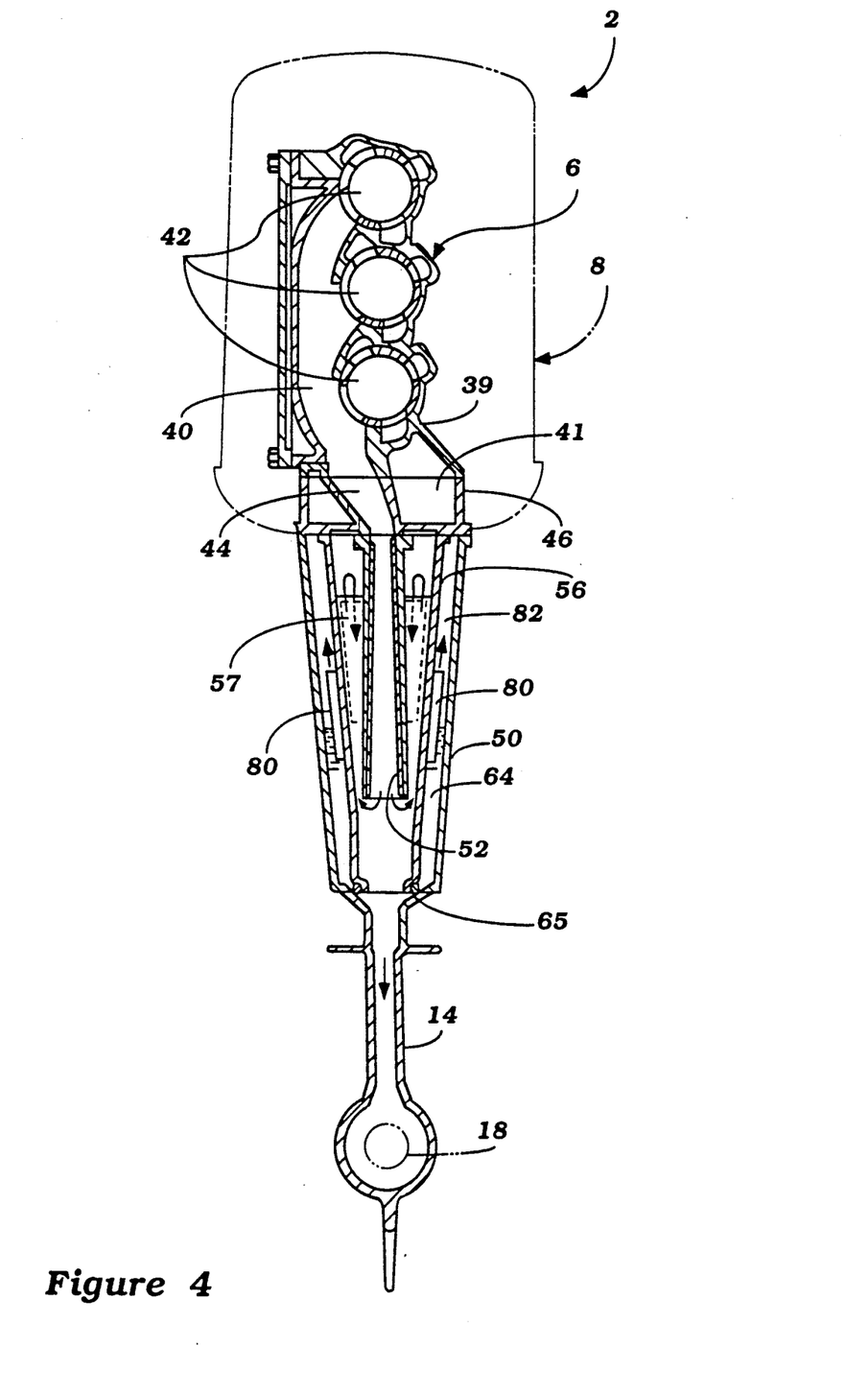
FIG. 4 is a cross-sectional view taken along the line IV—IV of FIG. 1.

Referring now additionally to FIGS. 2 through 4 a first embodiment of the exhaust gas purifying arrangement in accordance with the invention will be described.

As shown in FIG. 4, three exhaust ports, indicated generally by the reference numeral 40, are positioned by each of three cylinders, indicated by the reference numeral 42, located within the cylinder block 39 of the engine 6. The timings at the three exhaust ports 40 are set to differ by 120 degrees from each other. This makes it possible to utilize the pulsation effect of the exhaust to ensure the desired level of engine performance.

The three exhaust ports 40 open into a single exhaust gas conduit 44 located within a spacer plate 46. The spacer plate 46 is positioned immediately below the cylinder block 39. The spacer plate 46 further accommodates a cooling water jacket 41 in conjunction with the cylinder block 39 of the engine 6. The conduit 44 leads downwardly to a vertically disposed first exhaust passage 48 comprised of an exhaust pipe 49 and located within the upper casing 50 of the driveshaft housing 10. It should be noted that each sectional area taken across the width of the first exhaust passage 48 from an uppermost region of the passage 48 to a lowermost region of the passage 48 progressively increases. Furthermore, the minimum sectional area taken across the width of the uppermost region of the first exhaust passage 48 is greater than any sectional area taken across the width of any one of the exhaust ports 40.

A first catalyst 52 lines at least the lower part of the exhaust pipe 49 forming the first exhaust passage 48. This first catalyst 52 cleans that portion of the exhaust gases which impinge upon the catalyst 52 during the gases' downward flow through the passage 48.

The bottom end of the first exhaust passage 48 opens into an expansion chamber 54, employed to quiet the operation of the outboard motor 2. The walls of the expansion chamber 54 are comprised of a muffler 56 and a dividing baracade 57 integrally formed with the muffler 56. As indicated by the arrows, the exhaust gases flow from the first exhaust passage 48 and down into the expansion chamber 54, at which point they turn upwardly toward the top of the expansion chamber 54. At this point the exhaust gases turn downwardly again, in a direction toward the rear of the outboard motor 2, and enter a second downwardly extending exhaust passage 58.

Mounted by way of fixtures 60 within and across the second exhaust passage 58 is a second catalyst member 62, through which the exhaust gases must pass on their way through this passage 58. The catalyst 62 is positioned within the second passage 58 at a location higher than the waterline L of the body of water within which the watercraft is operated.

It is to be further noted that any sectional area taken across the width of the second exhaust passage 58 is larger than the minimum sectional area taken across the width of the uppermost region of the first exhaust passage 48. Thus, from the discussion above, it can be seen that the sectional areas progressively increase as the gas moves from the exhaust ports 40 then to the first exhaust passage 48 and on to the second exhaust passage 58. This increase in sectional areas reduces flow resistance of the exhaust gases as they travel along their flowpath.

A water jacket 64, for containing cooling water, is formed by an outer side of the muffler 56 and an inner side of an integral extension, forming a wall 63, of the upper casing 50, and surrounds a portion of the expansion chamber 54 and the second exhaust passage 58. To further aid in containing the water a sealing means 65 insures that the area between the lowermost portion of the muffler 56 and the wall 63 is watertight. Coolant water for filling the water jacket 64 is provided via a small passageway 66 extending downwardly from the cooling water jacket 41, as seen in FIG. 1.

After passing through the second catalyst 62 and arriving at an area just beneath the second catalyst 62 within the second exhaust passage 58, the exhaust gases can take either of two pathways leading outside of the propulsion unit. The primary exhaust passage, which discharges gases into the body of water within which the watercraft is operated and is the pathway utilized when the watercraft is operating at high speeds, will be discussed first. Next, the secondary exhaust passage, which discharges exhaust gases directly into the atmosphere and is utilized when the watercraft is operating at low speeds, will be discussed.

When traveling at high speeds, the exhaust gases are delivered from the area just below the catalyst 62 within the second exhaust passage 58 to an underwater exhaust gas discharge. Specifically, the exhaust gases proceed in a downward direction, indicated by the arrows, through a pathway within the lower unit 14. Ultimately, the exhaust gases flow through the hub area of the propeller 20 and are discharged through an exhaust outlet 70. The through the hub exhaust gas outlet 70 is extremely effective in silencing the high speed exhaust gases from the engine 6.

However, when operating at lower speeds the degree of submersion of the underwater exhaust outlet 70 is too great and the back pressure on the idling gases of the engine 6 will be too high to allow efficient operation. For that reason, there is provided a secondary, or low speed, exhaust gas discharge pathway.

An opening 74 is provided in the area just beneath the second catalyst 62 in a lower wall of the second exhaust passage 58. The opening leads directly into a bypass portion 78, formed by an outer wall 80, which extends upwardly from a position below the water line of the coolant water within the water jacket 64 to a cavity 82 above the water line and inside of the upper casing 50 of the driveshaft housing 10 and outside of the muffler 56. The exhaust gas flowpath through the opening 74 and upward into the upper casing 50 region is depicted by arrows; and is shown specifically in FIG. 3. Finally, a secondary exhaust outlet 84 is located at an upper portion of the cavity 82 and within the upper casing 50, which opens to the atmosphere.

It is to be noted that regardless of whether the exhaust gases are discharged via the high speed discharge pathway and through the exhaust outlet 70 or, on the other hand, via the low speed discharge pathway and through the secondary exhaust outlet 84, they will have passed along the first catalyst 52 as well as through the second catalyst 62; thus, assuring cleaning of the gases at any watercraft operating speed.

Two additional embodiments of the invention are depicted in FIGS. 5 through 8. Like reference numerals employed in the description of the first embodiment represent like elements in these two additional embodiments, which follow. Aspects of the following two embodiments not specifically addressed can be considered to be similar to those of the first embodiment.

Figure 5:
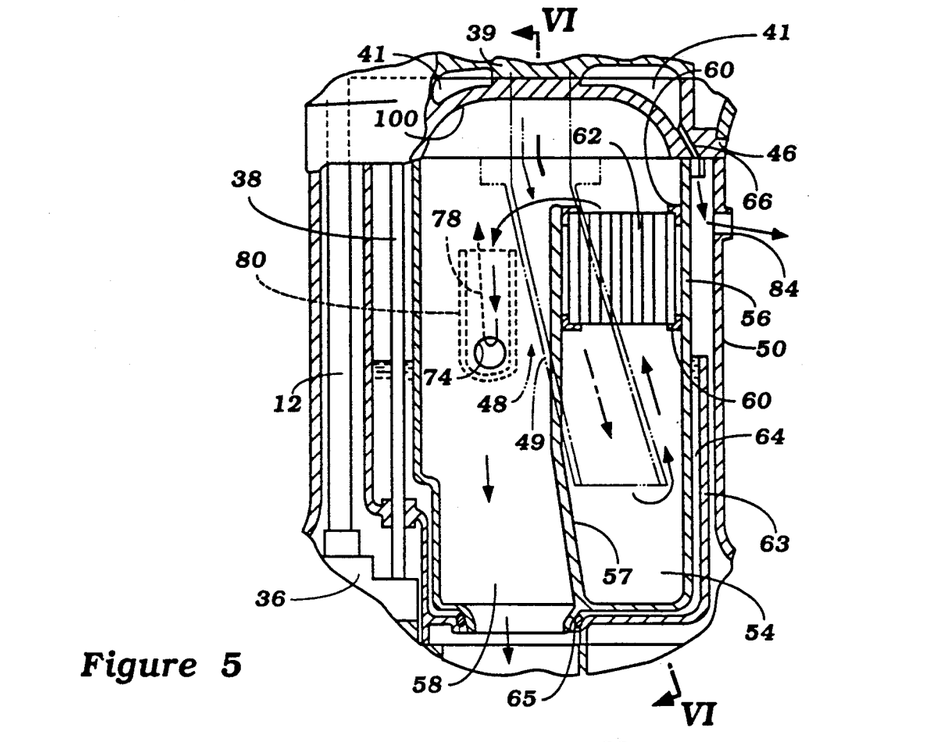
FIG. 5 is an enlarged side elevational view, with portions broken away, of an outboard motor constructed in accordance with a second embodiment of the invention.
Figure 6:
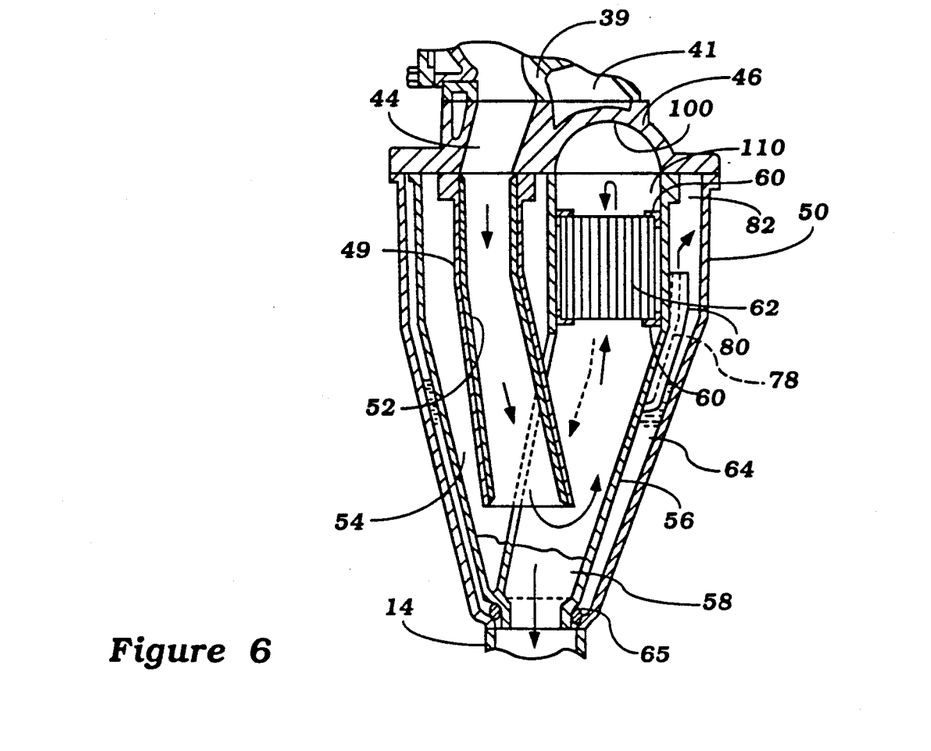
FIG. 6 is a cross-sectional view taken along the line VI—VI of FIG. 5.

FIGS. 5 and 6 show the second embodiment of the invention. Exhaust gases initially flow downwardly, from the gas conduit 44, through the first exhaust passage 48, which is at least partially lined with a first catalyst 52. Upon exiting the first exhaust passage 48 the exhaust gases enter an expansion chamber 54. After passing into the expansion chamber 54 the exhaust gases turn upwardly and flow in an upward direction. Positioned above the expansion chamber 54, and held in place by fixture members 60, is a second catalyst member 62. The second catalyst member 62 is located between a muffler 56 and an integrally formed dividing barricade 57. The second catalyst member 62 extends across the entire flow path of the exhaust gases, so that all of the gases must pass through the catalyst during their upward flow.

Just above the second catalyst member 62 the second exhaust passage 58 begins. Along the upper portion of the second exhaust passage 58 a concave region 100 is formed within the spacer plate 46. The exhaust gases are guided by this construction rearwardly with respect to the engine 6, and then in a downward direction, as indicated by the arrows.

The exhaust gases continue downwardly if the watercraft is operating at a high speed and flow along a discharge pathway like that of the high speed discharge pathway of the first embodiment, ultimately being expelled via a through the hub arrangement within the propeller (FIG. 1).

If the watercraft is operating at a low speed, the exhaust gases follow a discharge pathway similar to that of the low speed discharge pathway of the first embodiment. Specifically, the gases pass through an opening 74 and then upwardly through a bypass 78 which opens into a cavity 82. Finally the gases are discharged through a secondary exhaust outlet 84 located near an upper end of the cavity 82.

With the embodiment of FIGS. 5 and 6, if water from the body of water within which the watercraft is operated should flow back through the exhaust discharge flowpath, from the exhaust outlet 70, the water will not be able to reach the second catalyst member 62; and therefore will not disable its catalytic function. Such water backflow can result from events such as suddenly slowing the watercraft down from a high speed, or tilting up of the engine.

Figure 7:
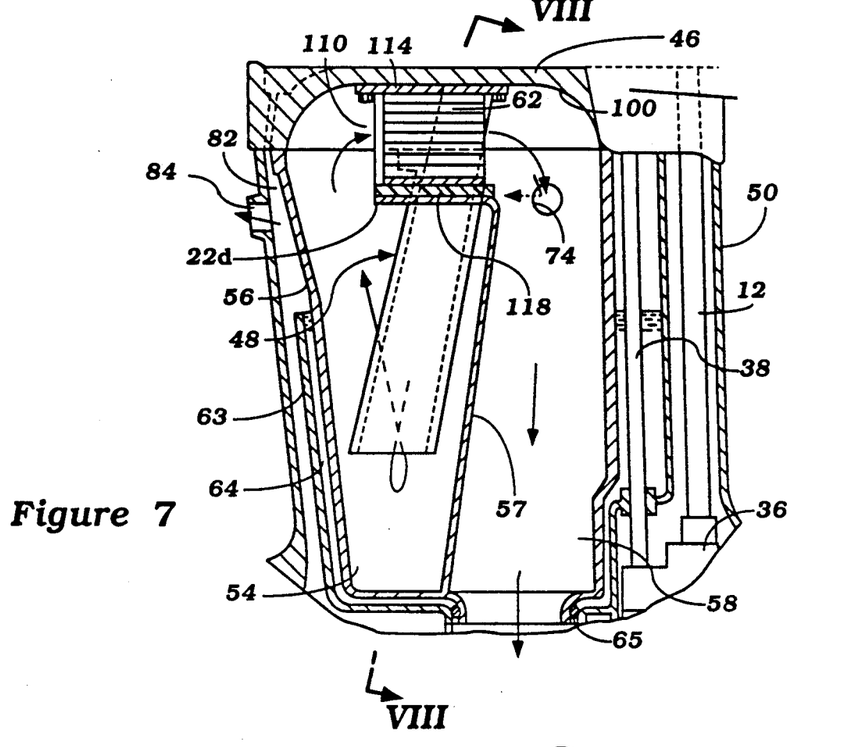
FIG. 7 is an enlarged side elevational view, with portions broken away, of an outboard motor constructed in accordance with a third embodiment of the invention.
Figure 8:
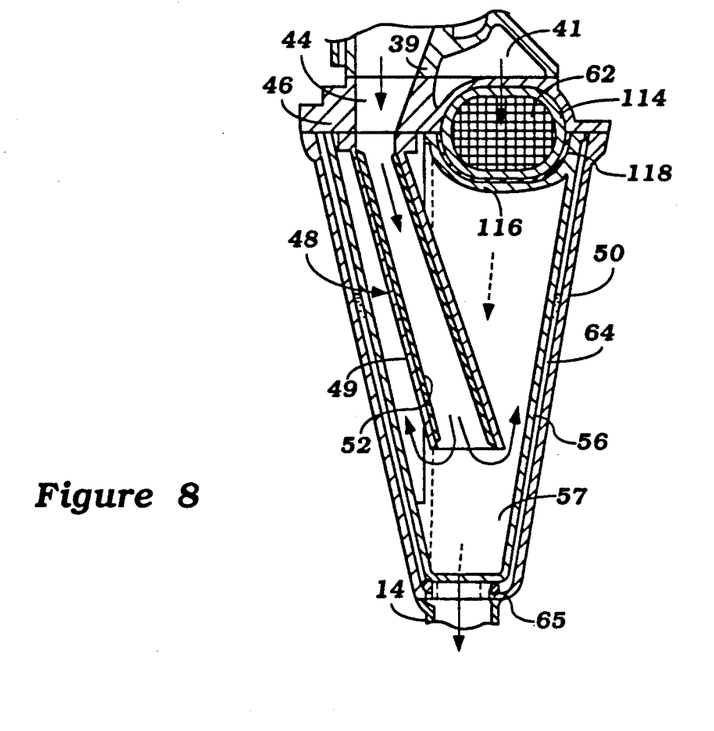
FIG. 8 is a cross-sectional view taken along the line VIII—VIII of FIG. 7.

FIGS. 7 and 8 show the third embodiment of the invention. Exhaust gases initially flow downwardly, from the gas conduit 44, through the first exhaust passage 48, which is at least partially lined with a first catalyst 52. Upon exiting the first exhaust passage 48 the exhaust gases enter an expansion chamber 54. After passing into the expansion chamber 54 the exhaust gases turn upwardly and flow in an upward direction. At an upper region of the expansion chamber 54 and just beneath a concave portion 100 of the spacer plate 46, an opening 110 is located which forms the beginning of the second exhaust passage 58.

Fastened in place along a lower side of the spacer plate 46 is a second catalyst member 62. The second catalyst member 62 extends horizontally across the entire flow path of the exhaust gases, so that all of the gases must pass through the catalyst during their upward flow. The second catalyst member 62 is surrounded by a sleeve 114 member which is, in turn, nested within a semi-cylindrical portion 116 of the muffler 56 and its integral dividing barricade 57. A bushing 118 may line the region between the semi-cylindrical portion 116 and the sleeve member 114. Further, the catalyst can be cooled by a cooling water jacket 41 formed between the spacer plate 46 and the cylinder block 39.

After passing through the second catalyst member 62, the exhaust gases continue downwardly if the watercraft is operating at a high speed and flow along a discharge pathway like that of the high speed discharge pathway of the first embodiment, ultimately being expelled via a through the hub arrangement within the propeller (FIG. 1).

If the watercraft is operating at a low speed, the exhaust gases follow a low speed discharge pathway. Specifically, the gases pass through an opening 74 and then horizontally through a cavity 82 towards a secondary exhaust outlet 84 located near an upper end of the cavity 82, through which the exhaust gases pass on their way into the atmosphere.

As with the embodiment of FIGS. 5 and 6, if water from the body of water within which the watercraft is operated should flow back through the exhaust discharge flowpath, from the exhaust outlet 70, the water will not be able to reach the second catalyst member 62; and therefore will not disable its catalytic function.

It should be readily apparent from the foregoing description that a number of embodiments of the invention have been illustrated and described each of which depicts an excellent catalyst arrangement within the exhaust system of an engine for highly effective cleaning of the exhaust gases. Although a number of embodiments of the invention have been illustrated and described, it should be readily apparent to those skilled in the art that various changes and modifications may be made without departing from the spirit and scope of the invention, as defined by the appended claims.

It is claimed:

1. An exhaust gas purifying arrangement for an outboard motor for a watercraft comprising an exhaust port and a first exhaust passage and a first catalyst member lining at least a portion of an inner wall of said first exhaust passage, said exhaust port opening into said first exhaust passage; and further comprising an exhaust expansion chamber which is operable at least for quieting operation of said outboard motor, said first exhaust passage opening into said exhaust expansion chamber; and further comprising a second exhaust passage originating just beyond said expansion chamber and a second catalyst member, said second catalyst member mounted within and across a section of exhaust passage beyond said expansion chamber at a location higher than the level of the water within which said outboard motor operates; and also, at least one discharge passageway, positioned beyond said second catalyst, for discharging said exhaust gas out of said outboard motor.

2. The exhaust gas purifying arrangement of claim 1 wherein said discharge passageway comprises a first passageway leading from said second exhaust passage, from a position beyond said second catalyst member, to an exhaust outlet located at a position below a body of water in which said watercraft operates.

3. The exhaust gas purifying arrangement of claim 2 wherein said discharge passageway further comprises a second passageway leading from said second exhaust passage, from a position beyond said second catalyst member, to an exhaust outlet located at a position above said body of water in which said watercraft operates.

4. The exhaust gas purifying arrangement of claim 1 wherein said first passageway is utilized to discharge said exhaust gas from said motor when said watercraft is operating at high speeds and said second passageway is utilized when said watercraft is operating at low speeds.

5. The exhaust gas purifying arrangement of claim 4 wherein each sectional area taken across the width of said first exhaust passage from an uppermost region of said first exhaust passage to a lowermost region of said first exhaust passage progressively increases.

6. The exhaust gas purifying arrangement of claim 5 wherein a minimum sectional area taken across the width of said uppermost region of said first exhaust passage is greater than any sectional area taken across the width of said exhaust port.

7. The exhaust gas purifying arrangement of claim 6 wherein any sectional area taken across the width of said second exhaust passage is larger than said minimum sectional area taken across the width of said uppermost region of said first exhaust passage.

8. The exhaust gas purifying arrangement of claim 7 further comprising a water jacket, for containing cooling water, at least partially positioned around said expansion chamber.

9. The exhaust gas purifying arrangement of claim 8 wherein said water jacket, for containing cooling water, additionally is positioned at least partially around said second exhaust passage.

10. The exhaust gas purifying arrangement of claim 9 wherein said engine is provided with three exhaust ports and the exhaust timings of said three exhaust ports differ by one hundred twenty degrees from one another.

11. The exhaust gas purifying arrangement of claim 10 wherein said exhaust outlet located at a position below said body of water in which said watercraft operates is formed within a propeller boss.

12. The exhaust gas purifying arrangement of claim 7 wherein said exhaust passage within which said second catalyst member is mounted is an upper region of said second exhaust passage.

13. The exhaust gas purifying arrangement of claim 12 wherein an exhaust gas flowpath through said second catalyst member extends in a vertical direction.

14. The exhaust gas purifying arrangement of claim 7 wherein said exhaust passage within which said second catalyst member is mounted is an upper region of said expansion chamber.

15. The exhaust gas purifying arrangement of claim 14 wherein an exhaust gas flowpath through said second catalyst member extends in a vertical direction.

16. The exhaust gas purifying arrangement of claim 7 wherein said exhaust passage within which said second catalyst member is mounted is an area located immediately beneath a spacer plate, said spacer plate positioned immediately beneath a cylinder block of said motor.

17. The exhaust gas purifying arrangement of claim 16 wherein an exhaust gas flowpath through said second catalyst member extends in a horizontal direction.

18. The exhaust gas purifying arrangement of claim 17 further comprising a cooling water jacket formed between said spacer plate and said cylinder block, said cooling water jacket positioned in close proximity to said second catalyst member.

19. An exhaust gas purifying arrangement for an outboard motor for a watercraft comprising an exhaust port and a first exhaust passage and a first catalyst member lining at least a portion of an inner wall of said first exhaust passage, said exhaust port opening into said first exhaust passage; and further comprising an exhaust expansion chamber, said first exhaust passage opening into said exhaust expansion chamber; and further comprising a second exhaust passage originating just beyond said expansion chamber and a second catalyst member, said second catalyst member mounted within and across a section of exhaust passage beyond said first exhaust passage, and wherein said second catalyst member is positioned above an outlet of said first exhaust passage, and additionally wherein said expansion chamber has a larger flow cross-sectional area between said catalyst members than said first exhaust passage; and also, at least one discharge passageway, positioned beyond said second catalyst, for discharging said exhaust gas out of said outboard motor.

* * * * *